(12) United States Patent
Choi (10) Patent No.: US 7,333,543 B2
(45) Date of Patent: Feb. 19, 2008

(54) MOTION VECTOR ESTIMATION METHOD AND APPARATUS THEREOF

(75) Inventor: Jung-hwa Choi, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 810 days.

(21) Appl. No.: 10/278,894

(22) Filed: Oct. 24, 2002

(65) Prior Publication Data
US 2003/0081683 A1     May 1, 2003

(30) Foreign Application Priority Data
Oct. 29, 2001    (KR) ............................... 2001-66745

(51) Int. Cl.
*H04N 7/12*     (2006.01)
(52) U.S. Cl. .................................. 375/240.16
(58) Field of Classification Search ............. 348/402, 348/403, 412, 401, 408.1, 415, 400.1, 398.1, 348/416.1, 398, 416, 408; 375/240.1, 240.13, 375/240.18, 240.09, 240.16, 240.11, 240.29; 382/240, 281, 238, 249, 246, 232; 386/52, 386/55, 95, 69, 68, 83
See application file for complete search history.

(56) References Cited

U.S. PATENT DOCUMENTS

| | | | | |
|---|---|---|---|---|
| 4,245,248 A | * | 1/1981 | Netravali et al. | 348/400.1 |
| 5,408,274 A | * | 4/1995 | Chang et al. | 348/700 |
| 5,790,686 A | * | 8/1998 | Koc et al. | 382/107 |
| 6,125,229 A | * | 9/2000 | Dimitrova et al. | 386/69 |
| 6,137,544 A | * | 10/2000 | Dimitrova et al. | 348/700 |
| 6,452,969 B1 | * | 9/2002 | Yim | 375/240.02 |
| 6,498,815 B2 | * | 12/2002 | Kleihorst et al. | 375/240.2 |
| 6,553,071 B1 | * | 4/2003 | Kim et al. | 375/240.19 |
| 2002/0044602 A1 | * | 4/2002 | Ohki | 375/240.03 |
| 2003/0026336 A1 | * | 2/2003 | Lee | 375/240.03 |

FOREIGN PATENT DOCUMENTS

| | | |
|---|---|---|
| KR | 1999-005283 A | 1/1999 |
| KR | 10-0235356 B1 | 9/1999 |

* cited by examiner

*Primary Examiner*—Marsha Banks-Howard
*Assistant Examiner*—Behrooz Senfi
(74) *Attorney, Agent, or Firm*—Sughrue Mion, Pllc.

(57) ABSTRACT

A method which calculates a motion vector based on a transformed picture obtained by Discrete Coefficient Transform (DCT) or a Wavelet transform, and an apparatus appropriate for the method. The motion vector estimating method in an encoding method for a moving picture based on a block, the motion vector estimating method includes dividing each of a (k–1)-th frame and a k-th frame into blocks, each of which has N×N picture elements, and transforming the blocks by applying an arbitrary transform method; and determining a search area having a size of W×W (here, W>N) in the (k–1)-th frame, finding an N×N block in the search area of the (k–1)-th frame which has an optimal similarity to an N×N block in the k-th frame, and estimating a motion vector by calculating the displacement of the found block.

14 Claims, 5 Drawing Sheets

MOTION VECTOR ESTIMATION METHOD AND APPARATUS THEREOF

BACKGROUND OF THE INVENTION

1. Field of the Invention

The present invention relates to a block-based moving picture encoding method, and more particularly, to a method which calculates a motion vector based on a transformed picture obtained by Discrete Coefficient Transform (DCT) or a Wavelet transform, and an apparatus appropriate for the method. The present application is based on Korean Patent Application No. 2001-66745, filed Oct. 29, 2001, which is incorporated herein by reference.

2. Description of the Related Art

Roughly speaking, three methods are used for compression of digital image data. The three methods include a method which reduces temporal redundancy, a method which reduces spatial redundancy, and a method which reduces data using the statistical characteristic of a generation code. A representative method for reducing temporal redundancy is a motion estimation and compensation method.

Figure 1:
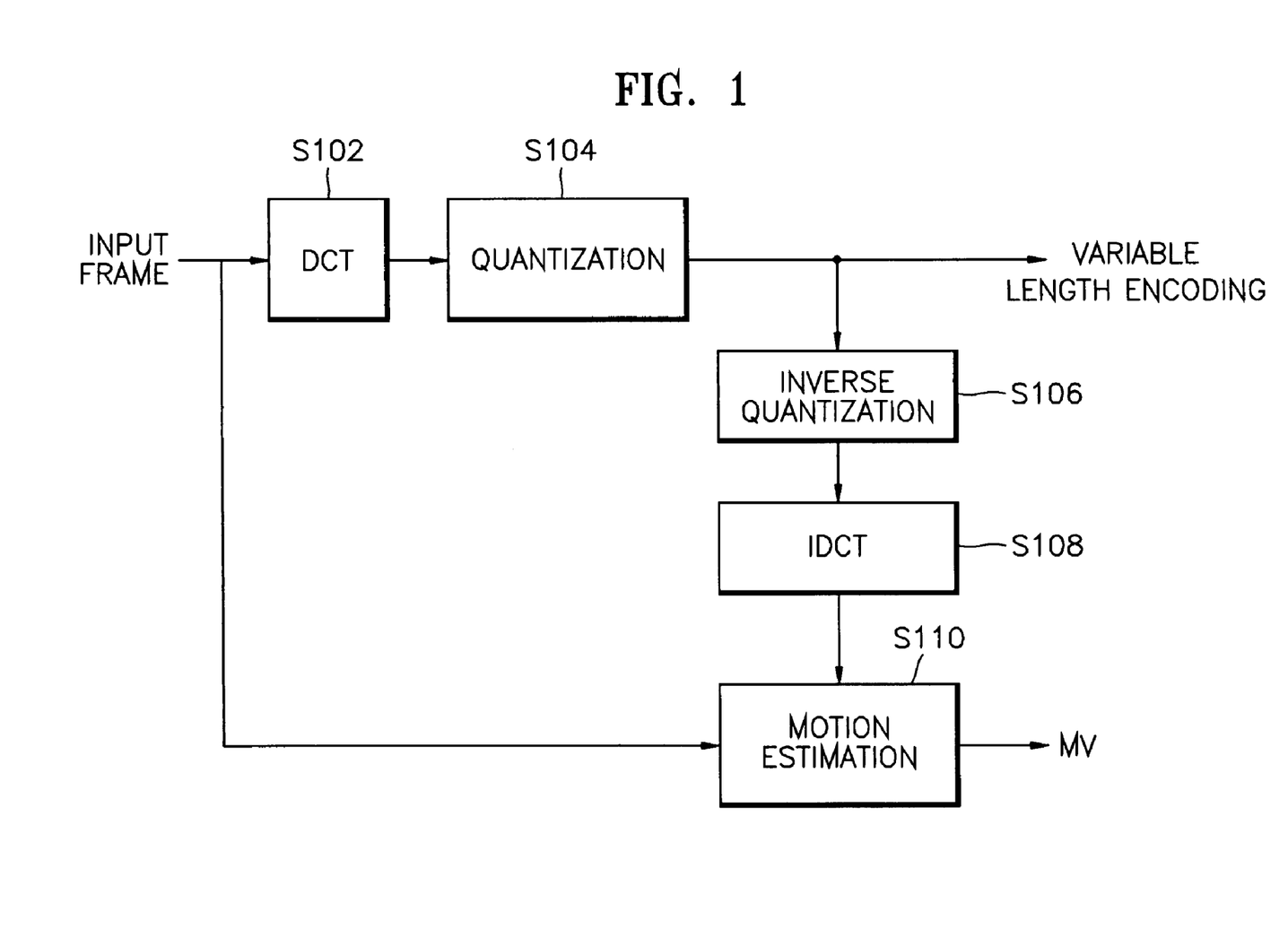
FIG. 1 is a block diagram of a prior art motion estimator.

FIG. 1 is a block diagram of a prior art motion estimator. In FIG. 1, an input frame image is divided into Discrete Cosine Transform (DCT) blocks, each of which has 8×8 picture elements. In a DCT transform process S102, input DCT blocks are DCT transformed and output. As the result of the DCT transform process S102, each DCT block has 8×8 DCT coefficients.

In a quantization process S104, DCT coefficients are quantized according to the quantization step size, and output. The output of the quantization process S104 is provided to a variable length encoding process (not shown). In the variable length encoding process, statistical coding for the quantized DCT coefficients are performed in units of a macro block. Also, statistical coded image data, a motion vector provided by the motion estimation process S108, and additional information such as the type of a macro block are multiplexed and output. Here, the macro block is usually formed with 6 DCT blocks, including 4 blocks of a luminance component and the remaining 2 blocks of a color difference component. The motion estimation is performed on the blocks having the luminance component.

Meanwhile, for motion estimation, the DCT block, which is output in the quantization process S104 and has quantized DCT coefficients, is reproduced as a DCT block having 8×8 picture elements again through the inverse quantization process S106 and the inverse-DCT transform process S108.

In a motion estimation process S110, a motion vector for each macro block is estimated with respect to a reproduced frame image ((K−1)-th frame) and an a frame image being input (K-th frame).

The motion vector estimated by the motion estimation process S110 is provided to the motion compensation process (not shown).

Figure 2:
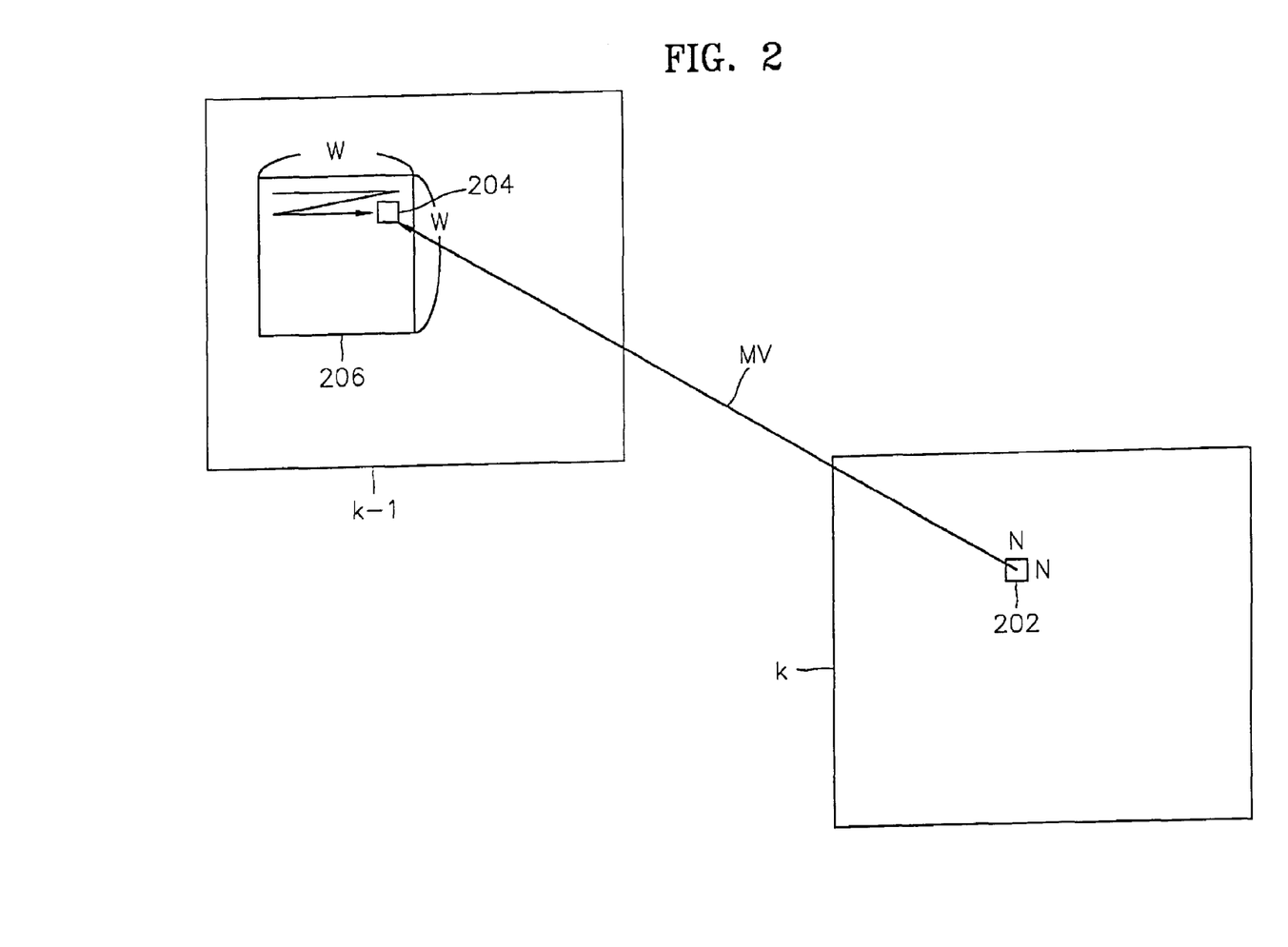
FIG. 2 is a schematic diagram of a motion estimation method according to the present invention.

As shown in FIG. 2, if the maximum displacement is P and the size of a block is N×N, for motion estimation, a search area 206 of W (=N×2P)×W (=N×2P) in a (k−1)-th frame is determined, and a block 204 which has the optimal similarity to the N×N block 202 in a k-th frame is searched for and obtained in the search area of the (k−1)-th frame. By calculating the displacement, a motion vector (MV) is obtained. As evaluation functions for measuring similarity, Mean Square Error (MSE), Mean of the Absolute Differences (MAD), and Sum of the Absolute Differences (SAD) are widely used.

Since the prior art motion estimation method as shown in FIG. 1 performs motion estimation on an original picture having picture element data, inverse quantization process and inverse-DCT transform process are needed. As a result, the process for estimating motion is delayed, which lowers the processing speed of moving picture encoder.

SUMMARY OF THE INVENTION

To solve the above problems, it is a first objective of the present invention to provide an improved method for estimating motion which increases the processing speed of a moving picture encoder.

It is a second objective of the present invention to provide an apparatus appropriate to the method.

To accomplish the first objective of the present invention, there is provided a motion vector estimating method in an encoding method for a moving picture based on a block, the motion vector estimating method including dividing each of a (k−1)-th frame and a k-th frame into blocks, each of which has N×N picture elements, and transforming the blocks by applying an arbitrary transform method; and determining a search area having a size of W×W (here, W>N) in the (k−1)-th frame, finding an N×N block in the search area of the (k−1)-th frame which has an optimal similarity to an N×N block in the k-th frame, and estimating a motion vector by calculating the displacement of the found block.

It is preferable that the arbitrary transform method is a Discrete Cosine Transform (DCT) method, or a Wavelet transform.

To accomplish the second objective of the present invention, there is provided a motion vector estimating apparatus based on a block having a transformer which divides each of a (k−1)-th frame and a k-th frame into blocks, each of which has N×N picture elements and transforms the blocks by applying an arbitrary transform method; a frame memory which stores the result of transforming the (k−1)-th frame; and a motion estimator which receives transform blocks of the k-th frame from the transformer, determines a search area having a size of W×W (here, W>N) in the (k−1)-th frame stored in the frame memory, finds an N×N block in the search area of the (k−1)-th frame which has an optimal similarity to an N×N block in the k-th frame, and estimates a motion vector by calculating the displacement of the found block.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 3:
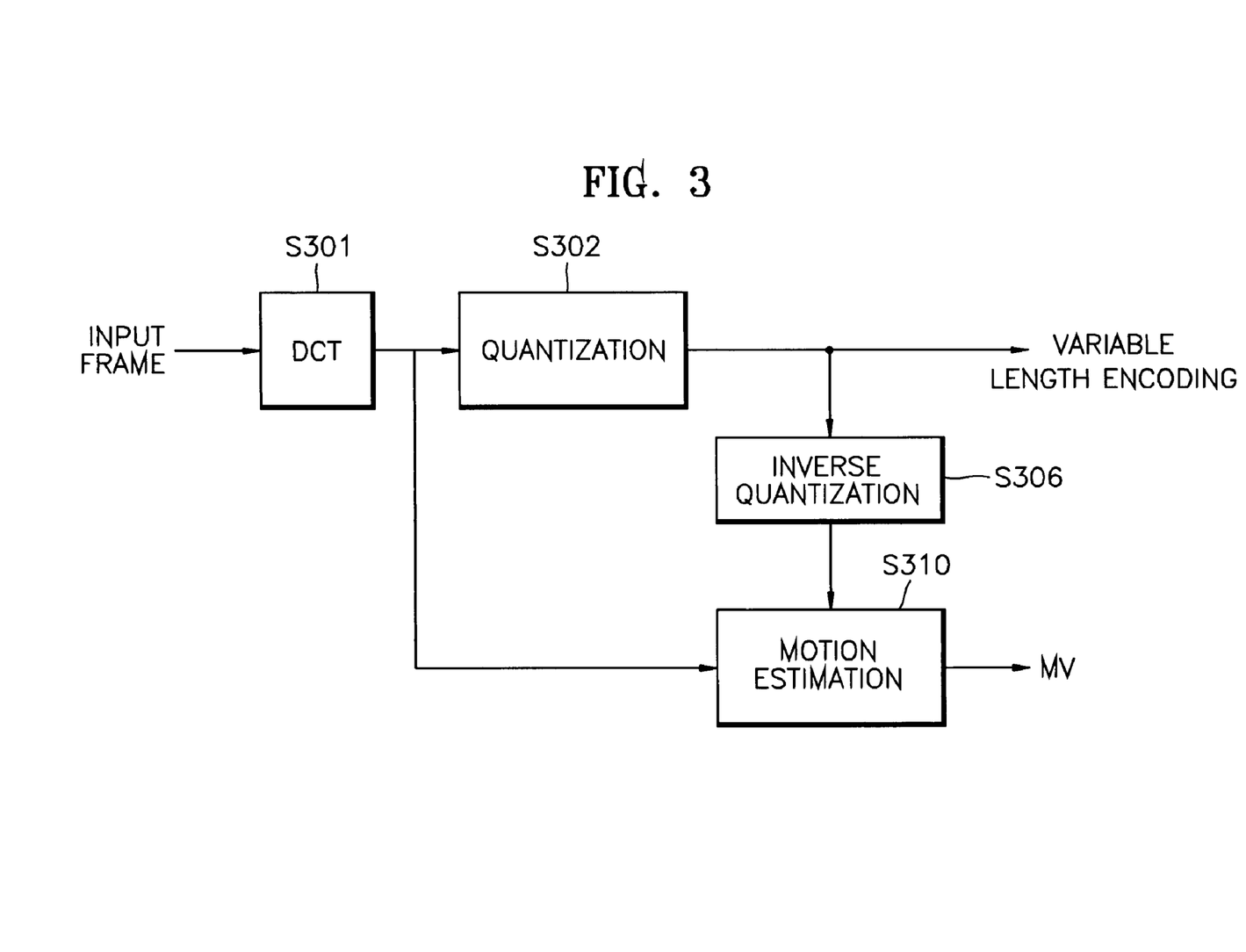
FIG. 3 is a schematic diagram of a method for determining similarity between DCT blocks in the motion estimation method according to the present invention.

FIG. 3 is a schematic diagram of a method for estimating a motion according to the present invention. A frame image which is input in FIG. 3 is divided into blocks, each of which is a transformed block having 8×8 picture elements. In the DCT transform process S301, original picture blocks which are input are transformed (for example, DCT transformed) and output. The DCT transform is to express an image signal in a temporal area as a frequency characteristic or as the characteristic value of a corresponding picture element in the entire image. In particular, using the frequency characteristic of the DCT transform concentrating on a low frequency band, the DCT coefficients in a high frequency band can be removed in encoding, and therefore the DCT transform is widely used in the MPEG standard.

As a result of the DCT transform process S301, each of the DCT blocks has 8×8 DCT coefficients.

In a quantization process S302, the DCT coefficients are quantized according to the size of a predetermined quantization step, and output.

Meanwhile, the DCT block which is output from the quantization process S302 and has quantized DCT coefficients is reproduced again to an original picture block having 8×8 picture elements through an inverse quantization process S306 for motion estimation.

In a motion estimation process S310, a motion vector for each macro block is estimated with respect to a reproduced frame image ((k−1)-th frame) and a frame image (k-th frame) which is being input.

The macro block is usually formed with 6 DCT blocks, including 4 blocks having luminance signals, and 2 blocks having color difference signals. Motion estimation is performed on the blocks having the luminance component.

More specifically, when the maximum displacement is P, and the size of a block is N×N, a search area of (N×2P)×(N×2P) in a (k−1)-th frame is determined and a block which has the optimal similarity to the N×N block in the k-th frame is searched for in the search area of the (k−1)-th frame and by calculating the displacement at this time, a motion is estimated. As evaluation functions for measuring similarity, Mean Square Error (MSE), Mean of the Absolute Differences (MAD), and Sum of the Absolute Differences (SAD) are widely used.

Here, the DCT block obtained by the DCT transform has the frequency characteristics of 8×8 picture elements before the transform, and the DCT blocks obtained by DCT transforming DCT blocks having similar picture elements have similar DCT coefficients. Accordingly, by checking the similarity of DCT coefficients in the DCT block, the motion vector of the block can be calculated.

Additionally, the total of the DCT coefficients in the DCT block, or the total of picture element values before the DCT transform can be referred to. For example, even after dividing each of the DCT coefficients in the DCT block by the total of the DCT coefficients in the corresponding DCT block or the total of picture element values before the DCT transform, similarity can be checked.

Figure 4:
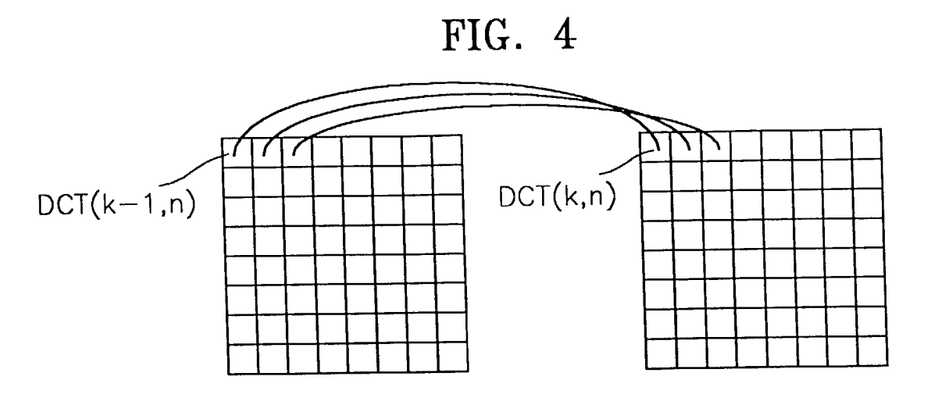
FIG. 4 is a schematic diagram of another method for determining similarity between DCT blocks in the motion estimation method according to the present invention.

FIG. 4 is a schematic diagram of a method for determining similarity between DCT blocks in the motion estimation method according to the present invention.

An error measure for checking similarity between DCT blocks can be obtained by adding differences of the DCT coefficients corresponding to a block and the DCT coefficients corresponding to an arbitrary block in a search area. That is, by obtaining the differences of DCT(k−1,n) and DCT(k,n) for all DCT coefficients of a corresponding DCT block, and then adding the absolute values of the differences, the similarity can be obtained. Here, n is an integer which is one of $\{0, 1, 2, \ldots, (N \times N-1)\}$.

For each DCT block in the search area in a (k−1)-th frame, similarity to the DCT block in the k-th frame is calculated. Among the DCT block in the search area in the (k−1)-th frame, a block showing the highest similarity to the DCT block in the k-th block is selected. By calculating the displacement between the DCT blocks, a motion vector is obtained.

Figure 5:
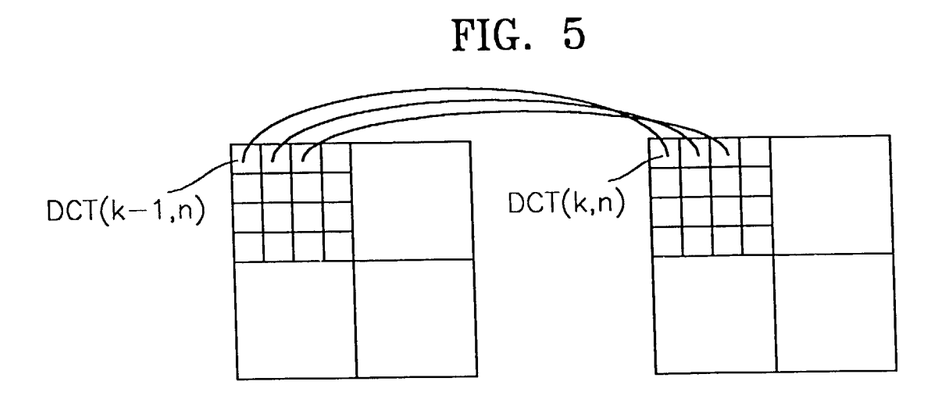
FIG. 5 is a schematic diagram of still another method for determining similarity between DCT blocks in the motion estimation method according to the present invention.

FIG. 5 is a schematic diagram of another method for determining similarity between DCT blocks in the motion estimation method according to the present invention.

The DCT transform converts an image signal in a temporal area into an image signal in a frequency area, and by the DCT transform, the frequency characteristic is concentrated in a low frequency band. In the present invention, using this, the DCT coefficients in a high frequency band are removed, and therefore calculation for motion estimation is simplified and the processing speed increases.

That is, as shown in FIG. 5, among the DCT coefficients of the DCT block, similarity checking is performed only for the low frequency coefficients of a 4×4 area in the top left hand corner.

In the similarity checking of FIG. 4 or 5, a process for increasing connectivity of a DCT block formed with DCT coefficients and a DCT block formed with picture elements can be performed. For example, a process for dividing each of the DCT coefficients in a DCT block formed with the DCT coefficients by the total of DCT coefficients included in the corresponding DCT block, or the total of the picture element values included in the corresponding DCT block, may be performed. By this process, the differences between DCT blocks are magnified, and connectivity of each DCT block to the original picture increases, and therefore, more accurate motion estimation is enabled.

Meanwhile, not using the quantization process and the inverse quantization process shown in FIG. 3 may be considered. That is, in the motion estimation process S310, estimating a motion based on the DCT blocks obtained in the DCT transform process S301 is possible.

In the motion estimation method according to the present invention, as a transform method, an example of the DCT transform is shown. Since most moving picture encoders are currently using the DCT transform complying with the MPEG standards, using the DCT transform as a transform method allows compatibility with implemented moving picture encoders.

However, if compatibility does not matter, other transform methods, for example, the Wavelet transform method which is appropriate for multiple-resolution transform, may be used.

Figure 6:
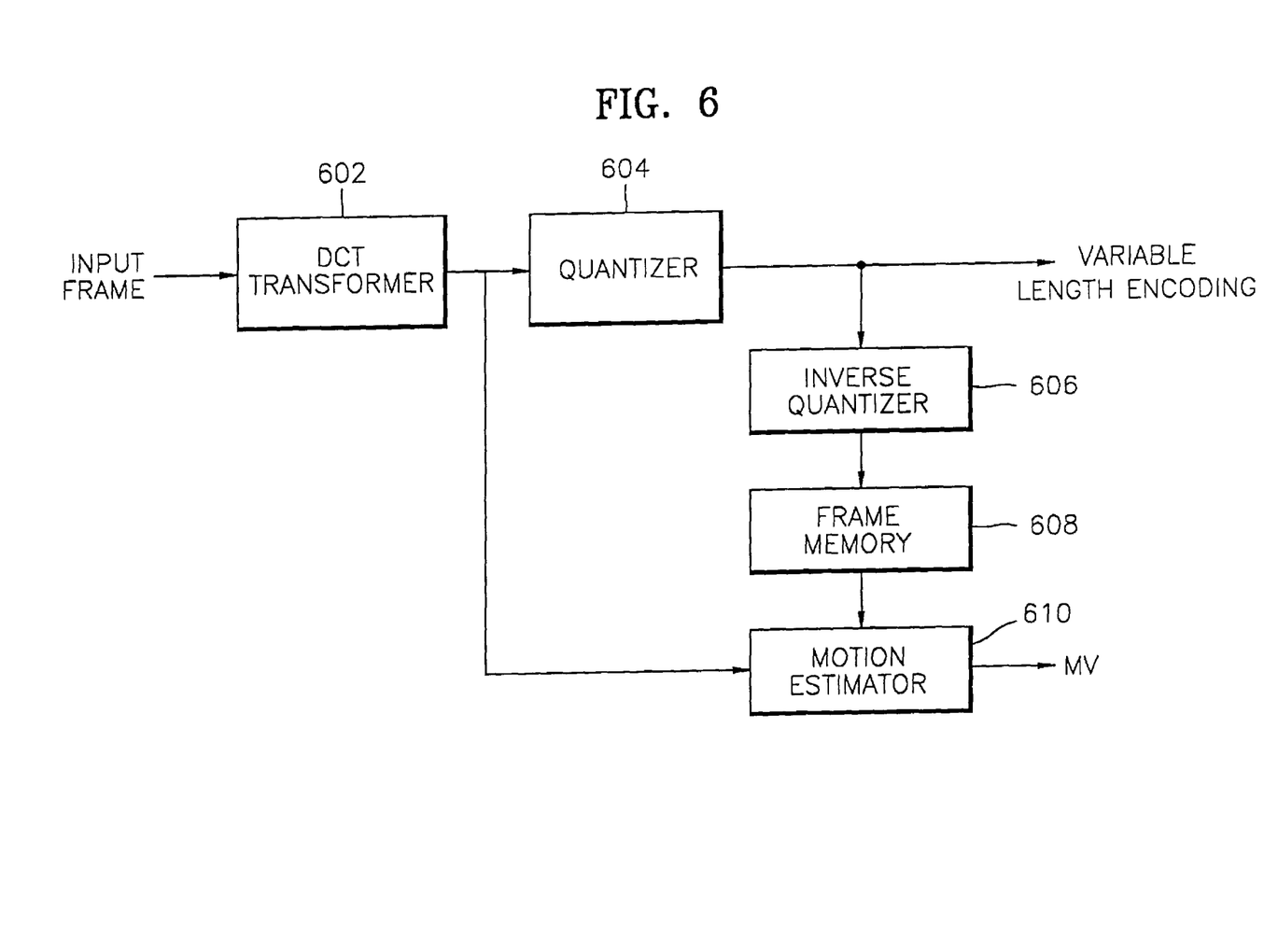
FIG. 6 is a block diagram of the structure of a motion estimation apparatus according to the present invention.

FIG. 6 is a block diagram of the structure of a motion estimation apparatus according to the present invention.

A DCT transformer 602 DCT transforms input DCT blocks and outputs the blocks. As the result of the DCT transform, each of the DCT blocks has 8×8 coefficients. A quantizer 604 quantizes the DCT coefficients according to the size of a quantization step and outputs the results.

Meanwhile, the DCT block which is output from the quantizer 604 and has the quantized DCT coefficients is again reproduced to a DCT block having 8×8 picture elements through an inverse quantizer 606 for motion estimation, and stored in a frame memory 608.

In a motion estimator 610, a motion vector for each macro block is estimated about the DCT block of a (k−1)-th frame which is stored in the frame memory 608, and the DCT block of a k-th frame which is being input.

More specifically, if the maximum displacement is P, and the size of a block is N×N, a search area of W (=N×2P)×W (=N×2P) in a (k−1)-th frame is determined, and a block which has the optimal similarity to the N×N block in a k-th frame is searched for and obtained in the search area of the (k−1)-th frame, and by calculating the displacement at this time, a motion vector (MV) is obtained.

The motion estimator 610 checks similarity between blocks according to the similarity checking method as shown in FIG. 4. Among the blocks in a search area of the (k−1)-th frame showing the highest similarity, a block having the optimal similarity to the N×N block in the k-th frame is selected, and by calculating the displacement between the blocks, a motion vector is obtained.

In calculating a motion vector by the motion estimator 610, some DCT coefficients in a high frequency band can be removed as shown in FIG. 5.

Also, in calculating a motion vector by the motion estimator 610, a process for dividing each of the DCT coefficients of a DCT block formed with the DCT coefficients by the total of the DCT coefficients included in the corresponding DCT block, or the total of the picture element values included in the corresponding DCT block may be performed.

Meanwhile, not using the quantizer and inverse quantizer shown in FIG. 6 may be considered. That is, it is possible to store the DCT block transformed by the DCT transformer 602 in the frame memory 608, and for the motion estimator 610 to estimate a motion about DCT blocks having DCT coefficients which are not quantized and inverse quantized.

As described above, since it is not needed to perform an inverse DCT transform in the motion estimation method according to the present invention unlike the prior art motion estimation method, time for calculating a motion vector and processing time of the moving picture encoder can be reduced.

What is claimed is:

1. A motion vector estimating method in an encoding method for a moving picture based on a block, the motion vector estimating method comprising:

dividing each of a (k−1)-th frame and a k-th frame into blocks, each of which has N×N picture elements, and transforming the blocks by applying an arbitrary transform method; and determining a search area having a size of W×W (here, W>N) in the (k−1)-th frame, finding an N×N block in the search area of the (k−1)-th frame which has an optimal similarity to an N×N block in the k-th frame, and estimating a motion vector by calculating the displacement of the found block;

wherein the similarity of the block in the k-th frame and the blocks in the search area of the (k−1)-th frame is obtained by adding the differences of the transform coefficients of the block in the k-th frame and transform coefficients of an arbitrary block in the search area of the (k−1)-th frame; and wherein in calculating the similarity of the block in the k-th frame and the blocks in the search area of the (k−1)-th frame, performing at least one operation of each of the transform coefficients of the block in the k-th frame is divided by a sum total of the transform coefficients of the block in the k-th frame, and the operation of each of the transform coefficients of the block in the search area of the (k−1)-th frame is divided by a sum total of the transform coefficients of the block in the search area of the (k−1)-th frame.

2. The method of claim 1, wherein the arbitrary transform method is a Discrete Cosine Transform (DCT) method.

3. The method of claim 1, wherein the arbitrary transform method is a Wavelet transform.

4. The method of claim 1, wherein the transform method is a Discrete Cosine Transform (DCT) method, and in calculating the similarity of the block in the k-th frame and the blocks in the search area of the (k−1)-th block, some DCT coefficients in a high frequency band are removed.

5. A motion vector estimating method in an encoding method for a moving picture based on a block, the motion vector estimating method comprising:

dividing each of a (k−1)-th frame and a k-th frame into blocks, each of which has N×N picture elements, and transforming the blocks by applying an arbitrary transform method; and determining a search area having a size of W×W (here, W>N) in the (k−1)-th frame, finding an N×N block in the search area of the (k−1)-th frame which has an optimal similarity to an N×N block in the k-th frame, and estimating a motion vector by calculating the displacement of the found block;

wherein the similarity of the block in the k-th frame and the blocks in the search area of the (k−1)-th frame is obtained by adding the differences of transform coefficients of the block in the k-th frame and transform coefficients of an arbitrary block in the search area of the (k−1)-th frame;

wherein the transform method is a Discrete Cosine Transform (DCT) method, and in calculating the similarity of the block in the k-th frame and the blocks in the search area of the (k−1)-th frame, some DCT coefficients in a high frequency band are removed; and wherein in calculating the similarity of the block in the k-th frame and the blocks in the search area of the (k−1)-th frame, performing at least one operation of each of the transform coefficients of the block in the k-th frame, other than said DCT coefficients in a high frequency band which are removed, is divided by a sum total of the transform coefficients of the block in the k-th frame, and the operation of each of the transform coefficients of the block in the search area of the (k−1)-th frame, other than said DCT coefficients in the high frequency band which are removed, is divided by a sum total of the transform coefficients of the block in the search area of the (k−1)-th frame.

6. A motion vector estimating method in an encoding method for a moving picture based on a block, the motion vector estimating method comprising:

dividing each of a (k−1)-th frame and a k-th frame into blocks, each of which has N×N picture elements, and transforming the blocks by applying an arbitrary transform method; and determining a search area having a size of W×W (here, W>N) in the (k−1)-th frame, finding an N×N block in the search area of the (k−1)-th frame which has an optimal similarity to an N×N block in the k-th frame, and estimating a motion vector by calculating the displacement of the found block;

wherein the similarity of the block in the k-th frame and the blocks in the search area of the (k−1)-th frame is obtained by adding the differences of the transform coefficients of the block in the k-th frame and transform coefficients of an arbitrary block in the search area of the (k−1)-th frame;

wherein the transform method is a Discrete Cosine Transform (DCT) method, and in calculating the similarity of the block in the k-th frame and the blocks in the search area of the (k−1)-th frame, some DCT coefficients in a high frequency band are removed; and wherein in calculating the similarity of the block in the k-th frame and the blocks in the search area of the (k−1)-th frame, performing at least one operation of each of the transform coefficients of the block in the k-th frame, other than said DCT coefficients in a high frequency band which are removed, is divided by a sum total of picture element values of the block in the k-th frame, and the operation of each of the transform coefficients of the block in the search area of the (k−1)-th frame, other than said DCT coefficients in the high frequency band which are removed, is divided by a sum total of picture element values of the block in the search area of the (k−1)-th frame.

7. The method of claim 1, wherein in calculating the similarity of the block in the k-th frame and the blocks in the search area of the (k−1)-th block, each of the transform coefficients is divided by the total of the picture element values of a corresponding block.

8. A motion vector estimating apparatus based on a block comprising:
 a transformer which divides each of a (k−1)-th frame and a k-th frame into blocks, each of which has N×N picture elements and transforms the blocks by applying an arbitrary transform method;
 a frame memory which stores the result of transforming the (k−1)-th frame; and
 a motion estimator which receives transform blocks of the k-th frame from the transformer, determines a search area having a size of W×W (here, W>N) in the (k−1)-th frame stored in the frame memory, finds an N×N block in the search area of the (k−1)-th frame which has an optimal similarity to an N×N block in the k-th frame, and estimates a motion vector by calculating the displacement of the found block;
 wherein the motion estimator searches blocks by similarity of the block in the k-th frame and the blocks in the search area of the (k−1)-th frame, the similarity obtained by adding the differences of the transform coefficients of the block in the k-th frame and the transform coefficients of an arbitrary block in the search area of the (k−1)-th frame; and
 wherein the motion estimator performs at least one of divides each of the transform coefficients of the block in the k-th frame by a sum total of the transform coefficients of the block in the k-th frame, and divides each of the transform coefficients of the block in the search area of the (k−1)-th frame by a sum total of the transform coefficients of the block in the search area of the (k−1)-th frame, when calculating the similarity of the block in the k-th frame and the blocks in the search area of the (k−1)-th frame.

9. The apparatus of claim 8, wherein the transformer performs a Discrete Cosine Transform (DCT).

10. The apparatus of claim 8, wherein the transformer performs a Wavelet transform.

11. The apparatus of claim 8, wherein the transform performs the DCT transform, and the motion estimator removes some DCT coefficients in a high frequency band in calculating the similarity of the block in the k-th frame and the blocks in the search area of the (k−1)-th block.

12. A motion vector estimating apparatus based on a block comprising:
 a transformer which divides each of a (k−1)-th frame and a k-th frame into blocks, each of which has N×N picture elements and transforms the blocks by applying an arbitrary transform method;
 a frame memory which stores the result of transforming the (k−1)-th frame; and
 a motion estimator which receives transform blocks of the k-th frame from the transformer, determines a search area having a size of W×W (here, W>N) in the (k−1)-th frame stored in the frame memory, finds an N×N block in the search area of the (k−1)-th frame which has an optimal similarity to an N×N block in the k-th frame, and estimates a motion vector by calculating the displacement of the found block;
 wherein the motion estimator searches blocks by similarity of the block in the k-th frame and the blocks in the search area of the (k−1)-th frame, the similarity obtained by adding the differences of transform coefficients of the block in the k-th frame and transform coefficients of an arbitrary block in the search area of the (k−1)-th frame;
 wherein the transform performs a DCT transform, and the motion estimator removes some DCT coefficients in a high frequency band in calculating the similarity of the block in the k-th frame and the blocks in the search area of the (k−1)-th block; and
 wherein the motion estimator performs at least one of divides each of the transform coefficients of the block in the k-th frame, other than said DCT coefficients in a high frequency band which are removed, by a sum total of the transform coefficients of the block in the k-th frame, and divides each of the transform coefficients of the block in the search area of the (k−1)-th frame, other than said DCT coefficients in the high frequency band which are removed, by a sum total of the transform coefficients of the block in the search area of the (k−1)-th frame, when calculating the similarity of the block in the k-th frame and the blocks in the search area of the (k−1)-th block.

13. A motion vector estimating apparatus based on a block comprising:
 a transformer which divides each of a (k−1)-th frame and a k-th frame into blocks, each of which has N×N picture elements and transforms the blocks by applying an arbitrary transform method;
 a frame memory which stores the result of transforming the (k−1)-th frame; and
 a motion estimator which receives transform blocks of the k-th frame from the transformer, determines a search area having a size of W×W (here, W>N) in the (k−1)-th frame stored in the frame memory, finds an N×N block in the search area of the (k−1)-th frame which has an optimal similarity to an N×N block in the k-th frame, and estimates a motion vector by calculating the displacement of the found block;
 wherein the motion estimator searches blocks by similarity of the block in the k-th frame and the blocks in the search area of the (k−1)-th frame, the similarity obtained by adding the differences of transform coefficients of the block in the k-th frame and the transform coefficients of an arbitrary block in the search area of the (k−1)-th frame;
 wherein the transform performs a DCT transform, and the motion estimator removes some DCT coefficients in a high frequency band in calculating the similarity of the block in the k-th frame and the blocks in the search area of the (k−1)-th frame; and wherein the motion estimator performs at least one of divides each of the transform coefficients of the block in the k-th frame, other than said DCT coefficients in a high frequency band which are removed, by a sum total of picture element values of the block in the k-th frame, and divides each of the transform coefficients of the block in the search area of the (k−1)-th frame, other than said DCT coefficients in the high frequency band which are removed, by a sum total of picture element values of the block in the search area of the (k−1)-th frame, when calculating the similarity of the block in the k-th frame and the blocks in the search area of the (k−1)-th frame.

14. The apparatus of claim 8, wherein the motion estimator divides each of the transform coefficients by the total of the picture element values of a corresponding block, in calculating the similarity of the block in the k-th frame and the blocks in the search area of the (k−1)-th block.

* * * * *